(12) United States Patent
Tian et al.

(10) Patent No.: US 8,565,301 B2
(45) Date of Patent: Oct. 22, 2013

(54) QUASI-CONSTANT-QUALITY RATE CONTROL WITH LOOK-AHEAD

(75) Inventors: Tao Tian, San Diego, CA (US); Peisong Chen, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1385 days.

(21) Appl. No.: 11/373,404

(22) Filed: Mar. 10, 2006

(65) Prior Publication Data
US 2006/0224762 A1 Oct. 5, 2006

Related U.S. Application Data

(60) Provisional application No. 60/660,908, filed on Mar. 10, 2005.

(51) Int. Cl.
H04N 7/12 (2006.01)
(52) U.S. Cl.
USPC ............... 375/240.05; 375/E7.026; 725/20
(58) Field of Classification Search
None
See application file for complete search history.

(56) References Cited

U.S. PATENT DOCUMENTS

| | | | |
|---|---|---|---|
| 5,602,594 A | 2/1997 | Cho et al. | |
| 5,929,916 A | 7/1999 | Legall et al. | |
| 6,167,084 A | 12/2000 | Wang et al. | |
| 6,181,742 B1 | 1/2001 | Rajagopalan et al. | |
| 6,269,217 B1 * | 7/2001 | Rodriguez | 386/224 |
| 6,278,735 B1 | 8/2001 | Mohsenian | |
| 6,731,685 B1 * | 5/2004 | Liu et al. | 375/240.14 |
| 6,859,496 B1 | 2/2005 | Boroczky et al. | |
| 2002/0034246 A1 | 3/2002 | Yamada et al. | |
| 2005/0237951 A1 * | 10/2005 | Yang et al. | 370/256 |

FOREIGN PATENT DOCUMENTS

| | | |
|---|---|---|
| JP | 2000041250 | 2/2000 |
| JP | 2003517743 | 5/2003 |
| WO | WO 0013419 | 3/2000 |

OTHER PUBLICATIONS

Netravali et al. (Picture Coding, A review; Proceedings of the IEEE, Mar. 1980, pp. 366-406).*
Jiang et al., "On Enhancing H.264 Rate Control by PSNR-Based Frame Complexity Estimation," Consumer Electronics, 2005, ICCE, 2005 Digest of Technical Papers, International Conference on Las Vegas, NV, USA Jan. 8-12, 2005, pp. 231-232, XP010796616.
International Search Report and Written Opinion—PCT/US06/008766, International Search Authority—European Patent Office—Jun. 29, 2006.

(Continued)

Primary Examiner — Adolf Dsouza
(74) Attorney, Agent, or Firm — Fulbright & Jaworski LLP

(57) ABSTRACT

Methods and apparatus efficiently encode multimedia data, such as live video streams. An encoding complexity of a predetermined time interval, such as 1 second, is estimated before the actual encoding that will be used. This permits the actual encoding to be performed with an a priori estimate of complexity, permitting the bits allocated for the predetermined time interval (bit rate) to be efficiently allocated within the predetermined time interval. Moreover, the estimated complexity can be provided to a device, such as a multiplexer, which can then allocate the available bandwidth for a collection of multiplexed video channels according to the encoding complexity anticipated for those video channels, which then permits the quality of a particular channel to remain relatively constant even when the bandwidth for the collection of multiplexed video channels is relatively constant.

49 Claims, 8 Drawing Sheets

(56) References Cited

OTHER PUBLICATIONS

Ramanathan, P., et al., "Rate-Distortion Analysis of Random Access for Compressed Light Fields", Proc. IEEE International Conference on Image Processing, ICIP—2004, Singapore, Oct. 2004, pp. 2463-2466.

Taiwan Search Report—TW095108356—TIPO—Apr. 3, 2013.

* cited by examiner

QUASI-CONSTANT-QUALITY RATE CONTROL WITH LOOK-AHEAD

CLAIM OF PRIORITY UNDER 35 U.S.C. §119

The present Application for Patent claims priority to Provisional Application No. 60/660,908 entitled "METHOD AND APPARATUS FOR QUASI-CONSTANT-QUALITY RATE CONTROL WITH LOOK-AHEAD" filed Mar. 10, 2005, and assigned to the assignee hereof and hereby expressly incorporated by reference herein.

REFERENCE TO CO-PENDING APPLICATIONS FOR PATENT

The present Application for Patent is related to the following co-pending U.S. patent application: "METHOD AND APPARATUS FOR CONTEXT-ADAPTIVE BANDWIDTH ADJUSTMENT IN VIDEO RATE CONTROL" filed "Mar. 9, 2006", and assigned to the assignee hereof and expressly incorporated by reference herein.

BACKGROUND

1. Field

The present invention relates generally to digital video, and more specifically to video compression.

2. Background

Due to the explosive growth and great success of the Internet and wireless communication, as well as increasing demand for multimedia services, streaming media over the Internet and mobile/wireless channels has drawn tremendous attention. In heterogeneous Internet Protocol (IP) networks, video is provided by a server and can be streamed by one or more clients. Wired connections include dial-up, integrated services digital network (ISDN), cable, digital subscriber line protocols (collectively referred to as XDSL), fiber, local area networks (LAN), wide area networks (WAN) and others. The transmission mode can be either uni-cast or multi-cast.

Similar to the heterogeneous IP network is mobile/wireless communication. Transport of multimedia content over mobile/wireless channels is very challenging because these channels are often severely impaired due to multi-path fading, shadowing, inter-symbol interference, and noise disturbances. Some other reasons such as mobility and competing traffic also cause bandwidth variations and loss. The channel noise and the number of users being served determine the time-varying property of channel environments.

Digital video is typically compressed for efficient storage and/or transmission. Many standards of video compression exist.

One problem common to video compression is a compromise between bandwidth (bits per second) and visual quality. Various measures, such as peak signal-to-noise ratio (PSNR), can be used to assess visual quality. It will be understood that with a constant frame rate, the bits used for encoding frames of video will be directly proportional to the bit rate or bandwidth for the video, and that these terms (bits and bandwidth), while technically are not the same, are often used interchangeably in the art and the correct interpretation can be determined from context.

The bandwidth needed for relatively good visual quality will vary with the complexity of the video being encoded. For example, a relatively static shot, such as a shot of a newscaster, can be encoded at relatively high visual quality with relatively low bandwidth. By contrast, a relatively dynamic shot, such as a shot panning athletes in a sporting event, can consume a relatively large amount of bandwidth for the same visual quality.

To achieve a relatively constant quality, it is desirable to use a technique known as variable bit rate (VBR) to vary the number of bits available to encode the frames. However, these VBR techniques are generally not applicable in the context of transmitted video content. Digital video content can be transmitted via a variety of mediums, such as via optical networks, wired networks, wireless networks, satellites, and the like. When broadcasting, these communication mediums are typically band limited. Accordingly, constant bit rate (CBR) techniques are typically found in the transmission or broadcast environment.

A problem with the use of constant bit rate (CBR) techniques is that the visual quality will vary according to the complexity of the video being encoded. When a shot is relatively static, such as a shot of a broadcaster, then more bits than needed for a given quality level will be consumed or "wasted." When a shot is relatively dynamic, such as in sports, then the quality can suffer with CBR. When the visual quality is compromised, visual artifacts can become apparent and can be observed as for example, "blockiness."

There is therefore a need in the art for encoding techniques which can combine the favorable attributes of relatively constant bit rate for the transmission medium, and relatively constant visual quality for the viewer's enjoyment.

SUMMARY

Systems and methods disclosed herein address the above stated needs by, for example, estimating an encoding complexity for a one or more multimedia data in predetermined time windows, and using the estimated encoding complexity to determine a bit rate for encoding.

One aspect is a method of encoding received video data, where the method includes: determining a first encoding complexity for a first portion of the video data; and; encoding the first portion of video data at least partially based on the first encoding complexity.

One aspect is an apparatus for encoding received video data, where the apparatus includes: means for determining a first encoding complexity for a first portion of the video data; and means for encoding the first portion of video data at least partially based on the first encoding complexity.

One aspect is an apparatus of encoding received video data, where the apparatus includes: a processor configured to determine a first encoding complexity for a first portion of the video data; and an encoder configured to encode the first portion of video data at least partially based on the first encoding complexity.

One aspect is a computer program product embodied in a tangible medium with instructions for encoding received video data, where the computer program product includes: a module with instructions for determining a first encoding complexity for a first portion of the video data; and a module with instructions for encoding the first portion of video data at least partially based on the first encoding complexity.

One aspect is a method for encoding multimedia data, where the method includes: encoding a first multimedia data corresponding to a selected window of data; and encoding a second multimedia data different than the first multimedia data, the second multimedia data corresponding to the selected window of data while re-encoding the first multimedia data.

One aspect is an apparatus for encoding multimedia data, where the apparatus includes: means for encoding a first multimedia data corresponding to a selected window of data and a second multimedia data different than the first multimedia data, the second multimedia data corresponding to the selected window of data; and means for re-encoding the first multimedia data while the encoding means encodes the second multimedia data.

One aspect is an apparatus for encoding multimedia data, where the apparatus includes: a first encoder configured to encode a first multimedia data corresponding to a selected window of data and to encode a second multimedia data different than the first multimedia data, the second multimedia data corresponding to the selected window of data; and a second encoder configured to re-encode the first multimedia data while the first encoder is encoding the second multimedia data.

One aspect is a method of encoding video data for multiple video channels that are multiplexed and carried together when transmitted, where the method includes: receiving video frames for video encoding for the multiple video channels; determining relative amounts of data needed to encode portions of the multiple channels at about the same quality level, wherein data for the encoded portions are to be multiplexed and carried together; allocating data for the encoded portions according to the determined relative amounts of data; encoding video frames according to the allocated data; and multiplexing the encoded video frames for transmission.

One aspect is a method of encoding a plurality of video channels that are multiplexed together in a band-limited transmission medium, where the method includes: receiving a plurality of video frames from multiple channels that are to be encoded, multiplexed, and then transmitted together, where the plurality of video frames include at least a plurality of frames corresponding to a predetermined time interval for each channel; allocating the bits available for the multiple channels among the multiple channels such that the visual quality of the multiple channels is about the same regardless of differences in encoding complexity; and encoding according to the allocated bits.

One aspect is a method of allocating available bandwidth among two or more video channels to be encoded in a compressed manner, the two or more video channels including at least a first video channel and a second video channel, where the method includes: estimating an encoding complexity associated with a set of video frames of a predetermined time period of the first video channel, where the predetermined time period is less than a duration of a video clip, wherein estimating is performed before an encoding that will actually be used; and using information based at least partially on the estimated encoding complexity for the actual encoding of the set of video frames.

One aspect is a method of allocating available bandwidth among a plurality of channels, where the method includes: receiving information regarding an encoding complexity metric for a set of video frames for each of the plurality of channels, where data for the sets of video frames are to be multiplexed for transmission in the same time period; and allocating available bits for the time period among the multiplexed channels at least partially based on the encoding complexity metric for each channel.

One aspect is an apparatus for video encoding, where the apparatus includes: a first processing element configured to estimate an encoding complexity associated with a set of video frames corresponding to a predetermined time period less than a time period associated with a length of a video clip; and a second processing element configured to encode the set of video frames using a bit rate selected at least partially based on the estimated encoding complexity.

One aspect is an apparatus for allocating available bandwidth among a plurality of channels, where the apparatus includes: an apportioning circuit configured to receive information regarding an encoding complexity metric for a collection of video frames for each of the plurality of channels, where data for the collections of video frames are to be multiplexed for transmission in the same time period; and a computation circuit configured to allocate available bits for the time period among the multiplexed channels at least partially based on the encoding complexity metric for each channel.

One aspect is a computer program product embodied in a tangible medium with instructions for encoding multimedia data, where the computer program product includes: a module with instructions for encoding a first multimedia data corresponding to a selected window of data and for encoding a second multimedia data different than the first multimedia data, the second multimedia data corresponding to the selected window of data; and a module with instructions for re-encoding the first multimedia data while the module with instructions for encoding is encoding the second multimedia data.

DETAILED DESCRIPTION

Figure 1:
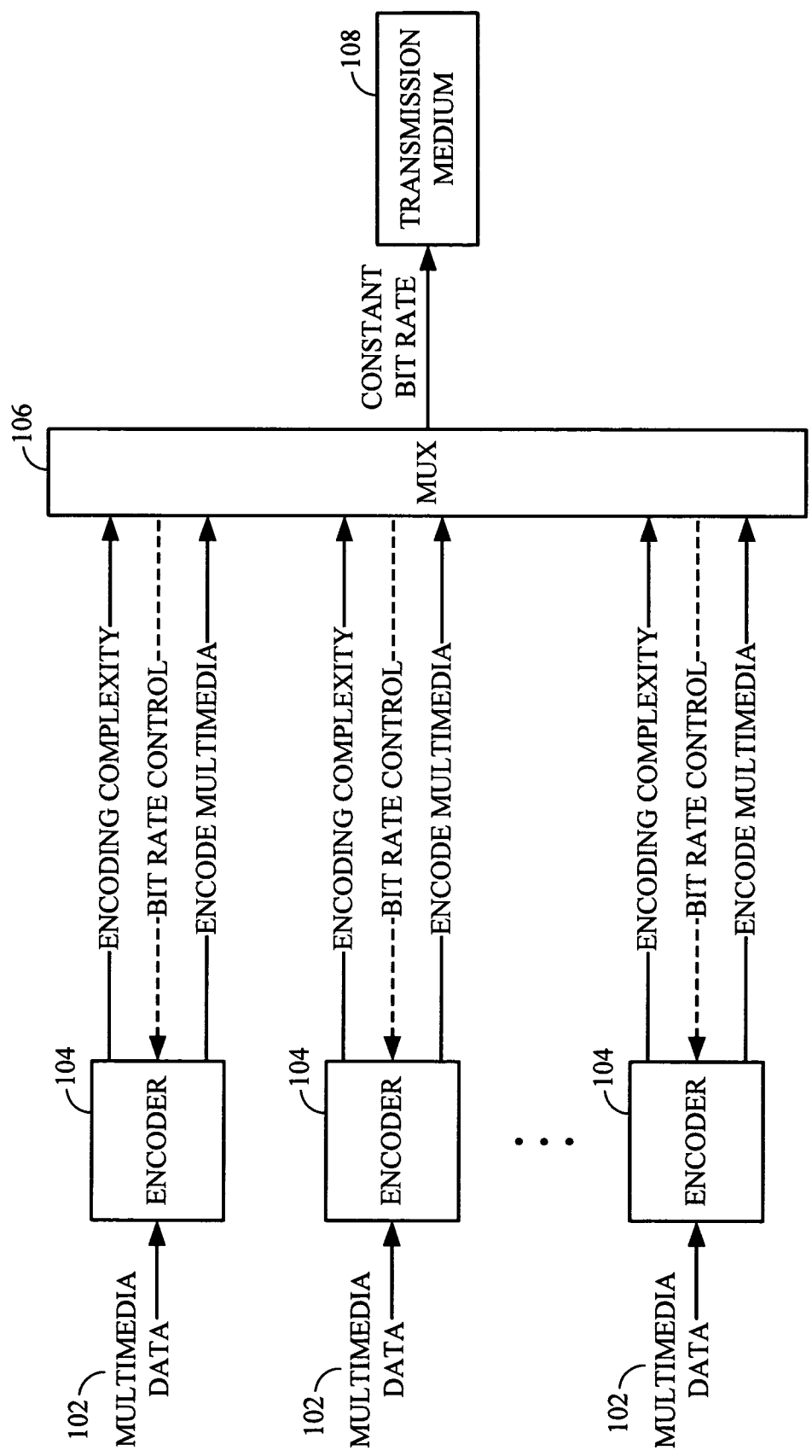
FIG. 1 is a system diagram illustrating the encoding of data for multiple multimedia data channels.

In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments. It is also understood by skilled artisans that electrical components, which are shown as separate blocks, can be rearranged and/or combined into one component It is also noted that some embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Methods and apparatus described below efficiently encode multimedia data, such as live video channels. An encoding complexity of a selected window where the window can be based on time or on a selected amount of data, for example, approximately 1 second or a part of multimedia data, such as 1 second, is estimated before the actual encoding that will be used. This permits the actual encoding to be performed with an a priori estimate of complexity, permitting the bits allocated for the predetermined time interval (bit rate) to be efficiently allocated within the select window.

The bit rate may be input from a device that estimates the bit rate based on bandwidth or quality or both. For example, a multiplexer may be implemented to provide the bit rate. The quality may be based on classification of content based on complexity. Such classification is discussed in co-pending patent application Ser. No. 11/373,577 entitled "Content Classification for Multimedia Processing".

Moreover, the estimated complexity can be provided to a device, such as a multiplexer, which can then allocate the available bandwidth for a collection of multiplexed multimedia channels, such as video channels, according to the encoding complexity anticipated for those multimedia channels, which then permits the quality of a particular channel to remain relatively constant even if the bandwidth for the collection of multiplexed channels is relatively constant. This provides a channel within a collection of channels to have a variable bit rate and relatively constant visual quality, rather than a relatively constant bit rate and a variable visual quality.

FIG. 1 is a system diagram illustrating the encoding of multiple sources, such as channels, of multimedia data 102. The multimedia data 102 are encoded by respective encoders 104, which are in communication when a multiplexer (MUX) 106, which in turn is in communication with a transmission medium 108. For example, the multimedia data 102 can correspond to various content channels, such as news channels, sports channels, movie channels, and the like. The encoders 104 encode the multimedia data 102 to the encoding format specified for the system. While described in the context of encoding of video data, the principles and advantages of the disclosed techniques are generally applicable to multimedia data including, for example, visual data and/or audio data. The encoded multimedia data are provided to a multiplexer 106, which combines the various encoded multimedia data and sends the combined data to the transmission medium 108 for transmission.

The transmission medium 108 can correspond to a variety of mediums, such as, but not limited to, digital satellite communication, such as DirecTV®, digital cable, wired and wireless Internet communications, optical networks, cell phone networks, and the like. In the case of wireless communication systems, the transmission medium 108 can comprise, for example, part of a code division multiple access (CDMA or CDMA2000) communication system or alternately, the system can be a frequency division multiple access (FDMA) system, an orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The transmission medium 108 can include, for example, modulation to radio frequency (RF). Typically, due to spectral constraints and the like, the transmission medium has a limited bandwidth and the data from the multiplexer 106 to the transmission medium is maintained at a relatively constant bit rate (CBR).

In conventional systems, the use of constant bit rate (CBR) at the output of the multiplexer 106 requires that the encoded multimedia data that are provided as inputs to the multiplexer 106 are also CBR. As described in the background, the use of CBR when encoding video content, for example, can result in a variable visual quality, which is typically undesirable.

In the illustrated system, two or more of the encoders 104 communicate an anticipated encoding complexity of input data. One or more of the encoder 104 may receive adapted bit rate control from the multiplexer 106 in response. This permits an encoder 104 that expects to encode relatively complex multimedia to receive a higher bit rate or higher bandwidth (more bits per frame) for those frames of multimedia in a quasi-variable bit rate manner. This permits, for example, in a visual context, the multimedia data 102 to be encoded with more consistent visual quality. The extra bandwidth that is used by a particular encoder 104 encoding relatively complex video comes from the bits that would otherwise have been used for encoding other multimedia data 102 if the encoders were implemented to operate at constant bit rates. This maintains the output of the multiplexer 106 at the constant bit rate (CBR).

While an individual source of multimedia data 102 can be relatively "bursty," that is, vary in used bandwidth, the cumulative sum of multiple sources of multimedia data can be less bursty. The bit rate from channels that are encoding less complex multimedia can be reallocated by, for example, the multiplexer 106, to channels that are encoding relatively complex multimedia, and this can enhance, for example, the visual quality of the combined multimedia data as whole. Disclosed techniques can be used to allocate the bandwidth adaptively such that little or no user intervention in the setting of bandwidth for multimedia data is needed.

In one example, the encoders 104 provide the multiplexer 106 with an indication of the complexity of a set of multimedia data, such as video frames, to be encoded and multiplexed together. For example, the multiplexer 106 may multiplex predetermined windows of data, such as one-second long data windows of encoded data, at a time. In this predetermined window of data, the output of the multiplexer 106 should provide an output that is no higher than the bit rate specified for the transmission medium 108.

For example, the indication of the complexity can correspond to an estimate of the number of bits that would be used to encode the multimedia data for the window of data for a given level of quality. The multiplexer 106 analyzes the indications of complexity, and provides the various encoders 104 with an allocated number of bits or bandwidth, and the encoders 104 use this information to encode the multimedia data in the set. This permits a set multimedia data to individually be variable bit rate, and yet achieve constant bit rate as a group.

Figure 2:
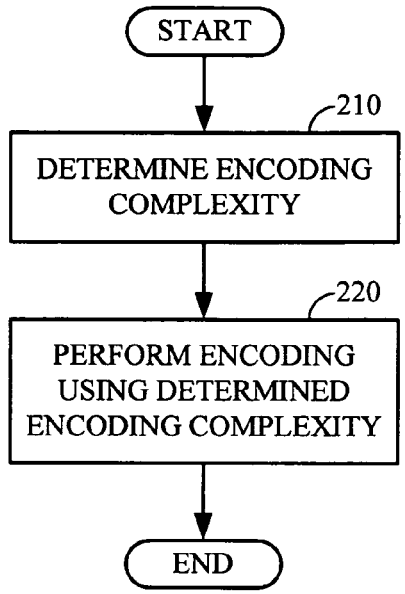
FIG. 2 is a flowchart generally illustrating a process of encoding.

FIG. 2 is a flowchart generally illustrating a process of encoding. It will be appreciated by the skilled practitioner that the illustrated process can be modified in a variety of ways. For example, in another embodiment, various portions of the illustrated process can be combined, can be rearranged in an alternate sequence, can be removed, and the like.

States 210 and 220 of the process will be described from the perspective of an encoder means such as encoder 104 of FIG. 1 that is cooperatively encoding with other encoders via a multiplexer to efficiently use the bandwidth available to the group of encoders whose outputs are being multiplexed. States 320 and 330 are written from the perspective of a multiplexer or other bandwidth allocating device if separate from the multiplexer.

The illustrated process estimates an encoding complexity for a predetermined time period or window at state 210. This predetermined time period or window can vary in a relatively broad range. For example, this predetermined time period can range from about 500 milliseconds to about 10000 milliseconds. A relatively good value for the predetermined time period is about 1 second. It should be noted that this predetermined time period, termed "super frame," does not correspond to the time period for a group of pictures (GOP), that is, groups of pictures related to an Intra-frame, unless the group of pictures coincidentally matches with the predetermined time period. Rather, a super frame may be a given number of successive pictures. It will be understood that in a system where a multiplexer or similar device collects various multimedia data in periodic intervals, such as predetermined numbers of frames, for packaging in a multiplexed manner, the predetermined time period should match the periodic time interval used by the multiplexer. For example, a multiplexer can use a predetermined time interval of, for example, about one second over which to allocate bits or bandwidth to individual channels to conform to the bandwidth limit for the multiplexed data.

One example of estimating the encoding complexity is via an encoding process, such as an encoding similar to a "first pass" encoding process of a dual pass or multiple pass encoding scheme. In a first pass encoding process, a standard default quality level, such as a default quantization parameter (QP) level, is typically used. Another technique for estimating encoding complexity is a bandwidth ratio metric which will be described below.

In a traditional multiple-pass encoding scheme, an entire multimedia clip, such a 2-hour movie, is first encoded in a first pass without saving the encoded video, and is then encoded again. Metrics or statistics gathered from the first-pass encoding, such as how complex or how much motion a particular set of frames has, is then used to adjust the bit rate that is used in the second-pass or later encoding. This improves the quality of the encoded video.

However, while such conventional multiple-pass techniques are useful for the encoding of non-real time data, such as encoding of movies for storage on a DVD, the lag of encoding an entire clip is typically not appropriate for the encoding of data in a broadcasting or other distribution environment in which a relatively large latency would not be acceptable. Often, multimedia data can carry content that is live, such as news broadcasts or sporting events. In addition, multimedia data can carry content that is outside the control of the entity distributing the multimedia, such that even when a particular content is not "live," it is treated as live.

For live multimedia data such as news and sporting events, a large latency of, for example, hours in duration, is typically not acceptable. However, a relatively short latency may be acceptable and unnoticeable in many situations. The disclosed techniques with the predetermined time period or window introduce relatively short latencies, such as latencies in the few seconds range. These latencies are typically not objectionable by viewers of live content.

When the encoding complexity for the predetermined time period is known, this information can be used to efficiently allocate bits for the actual encoding 220 of the process. For example, the encoding complexity information can be used independently of encoding complexity of other channels, and the actual encoding 220 will still have an observable benefit. Minor variations in bit rate can typically be accommodated by a buffer. When combined with bit rate allocation from other sources of multimedia data, the process can be improved even further. This variation is described in FIG. 3.

Figure 3:
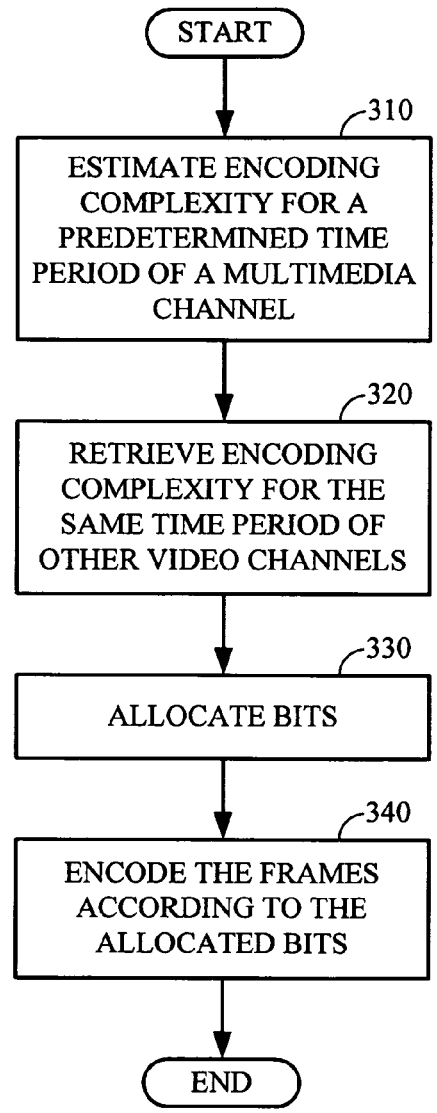
FIG. 3 is a flowchart generally illustrating a process of encoding while selecting a bit rate based on the complexity of data for multiple multimedia channels.

FIG. 3 is a flowchart generally illustrating a process of encoding while selecting a bit rate based on the complexity of multiple sources of multimedia data. It will be appreciated by the skilled practitioner that the illustrated process can be modified in a variety of ways. For example, in another embodiment, various portions of the illustrated process can be combined, can be rearranged in an alternate sequence, can be removed, and the like.

States 310 and 340 of the process will be described from the perspective of an encoder means such as encoder 104 of FIG. 1 that is cooperatively encoding with other encoders via a multiplexer to efficiently use the bandwidth available to the group of encoders whose outputs are being multiplexed. States 320 and 330 are written from the perspective of a multiplexer means such as multiplexer 106 of FIG. 1 or other bandwidth allocating device if separate from the multiplexer.

The illustrated process estimates an encoding complexity for a predetermined time period or window at state 310. This estimating act 310 can be the same as that described for the estimating act 210 of the process earlier described in connection with FIG. 2. However, it should be noted that the predetermined time period for estimating act 310 of FIG. 3 should match the time period or window over which the multiplexer allocates bits or bandwidth.

The process advances to retrieving the encoding complexity at state 320 for the same predetermined time period from other channels. In a particular time period, the encoded video from the various encoded channels will be multiplexed and should not exceed the total bandwidth allotted to the multiplexed communication channel.

The process advances to allocating bits among the various channels at state 330. For example, the information regarding the encoding complexity can be related to a number of bits that is expected to be consumed for a given visual quality. This number of bits can be summed, and the number of bits allocated to the channels can depend on the relative number of bits expected to be consumed. For example, a pro-rata portion of the total available bandwidth can be apportioned to each channel based on the channel's pro-rata expected bit consumption. In another example, the channels can be assigned to various preselected bit rates, such as to one of a low bandwidth, medium bandwidth, or a high bandwidth, depending on the relative number of bits expected to be consumed. It should also be noted that each system can have particular system limits for maximum bandwidth and for minimum bandwidth, and that the allocation of bits should not exceed these limits. The allocated bits for the set of frames for the predetermined period, termed super frame, are then provided to the encoder for bit rate control at the super frame level.

At state 340, the encoder then encodes the frames of the super frame or predetermined period according to the allocated bits. This permits an individual channel or groups of channel to have a variable bit rate (VBR) to achieve nearly constant quality, and yet provide an output of a multiplexer with multiple channels to maintain a constant bit rate (CBR) at an output.

Figure 4:
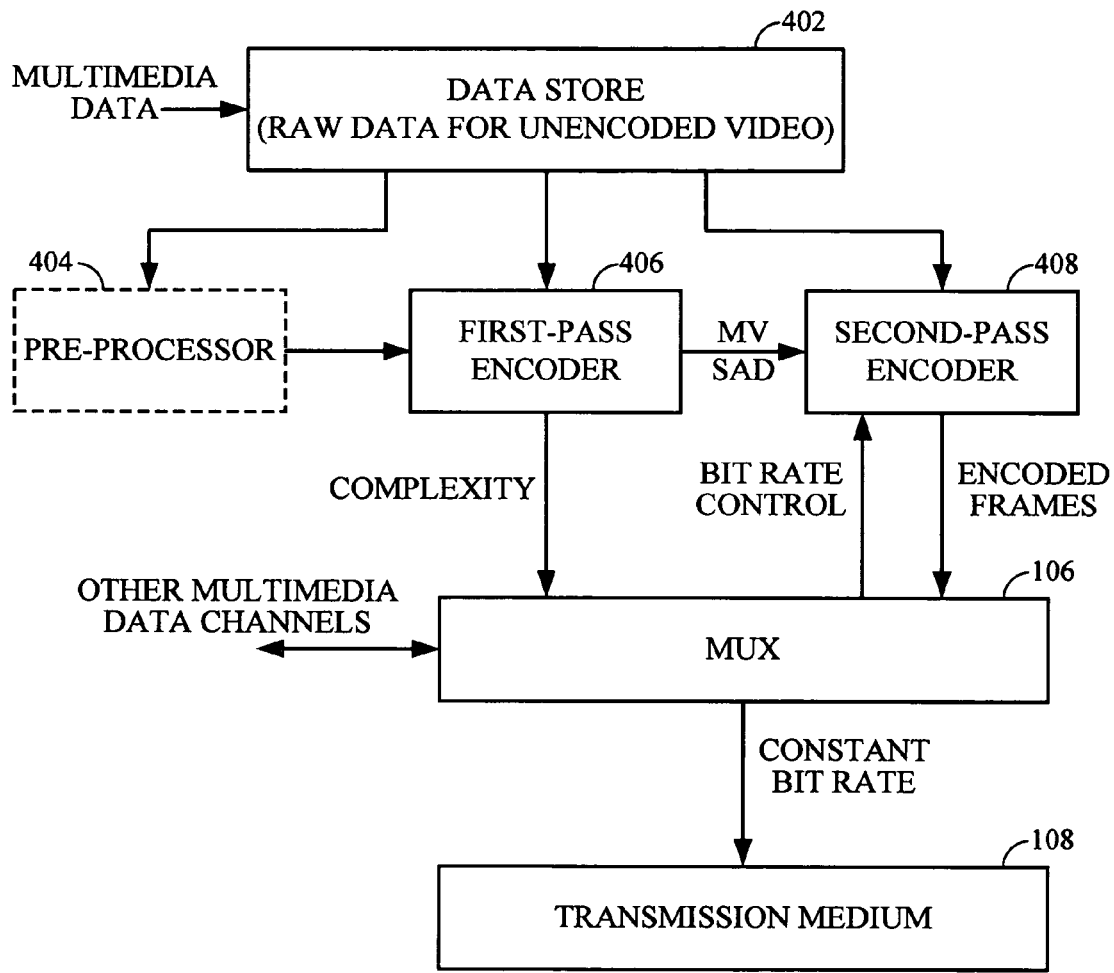
FIG. 4 is a system diagram illustrating an example of a multiple-pass, look ahead encoder that is interactive with a multiplexer.

FIG. 4 is a system diagram illustrating an example of a multiple-pass, look ahead video encoder that is interactive with a multiplexer. The illustrated system uses a two-pass architecture, but it will be understood that more than two-passes can be used. The system includes a data store 402, an optional pre-processor 404, a first-pass encoder 406, a second-pass encoder 408, a multiplexer 106, and a transmission medium 108. The system can be implemented in a variety of ways. For example, one or more of the optional pre-processor 404, the first-pass encoder 406, and the second-pass encoder 408 can be combined, can be separate and controlled by a common controller, and the like.

The data store 402 stores the incoming multimedia data. The data store 402 can be implemented by a wide variety of devices, such as solid state memory (DRAM, SRAM), hard drives, and the like. The optional pre-processor 404 can compute a bandwidth ratio metric for bit allocation within groups of frames in the encoding process. The bandwidth ratio metric will be described later. In the illustrated system, the pre-processor 404 operates independently of the super-frame level bit rate control. The optional pre-processor 404 provides these metrics to the first-pass encoder 406 and to the second pass encoder 408.

The optional pre-processor 404, the first-pass encoder 406, and the second-pass encoder 408 are arranged in a pipelined architecture. In this pipelined architecture, the latency for each stage should be the same, that is, each stage should process the same amount of data. The amount of data corresponds to the frames of the predetermined time period or window. These frames are referred to as a super frame. While the second-pass encoder 408 is encoding a set of frames, the first pass encoder 406 is performing a first-pass encoding of the next set of frames to be encoded by the second-pass encoder 408, and the optional pre-processor 404 processes the next set of frames to be first-pass encoded by the first-pass processor 406. The raw data for the unencoded video can be retrieved from the data store 402 and references to this data can be passed among the module as memory pointers and the like.

The first-pass encoder 406 encodes the multimedia data frames for the predetermined time period. However, the actual encoded multimedia data frames do not have to be used and are typically discarded. Complexity metrics, such as the number of bits used to encode the frames at a given quality level, are provided to the multiplexer 106. Other data that can be reused, such as computations of motion vectors (MV) and sum of absolute pixel difference (SAD), can be provided from the first-pass encoder 406 to the second-pass encoder 408.

The complexity metrics are used by the multiplexer 106 to allocate the bits available for the combined multiplexed data among the various channels. For example, the multiplexer 106 can use the allocating bits state 330 of the process described earlier in connection with FIG. 3. The allocated bits are then provided to the second-pass encoder 408 for encoding of those frames.

The second-pass encoder 408 then encodes the frame in the next cycle of the pipeline, and the encoded frames are made available to the multiplexer 106 for multiplexing with data from other channels and transmission via the transmission medium in the subsequent cycle of the pipeline.

Figure 5:
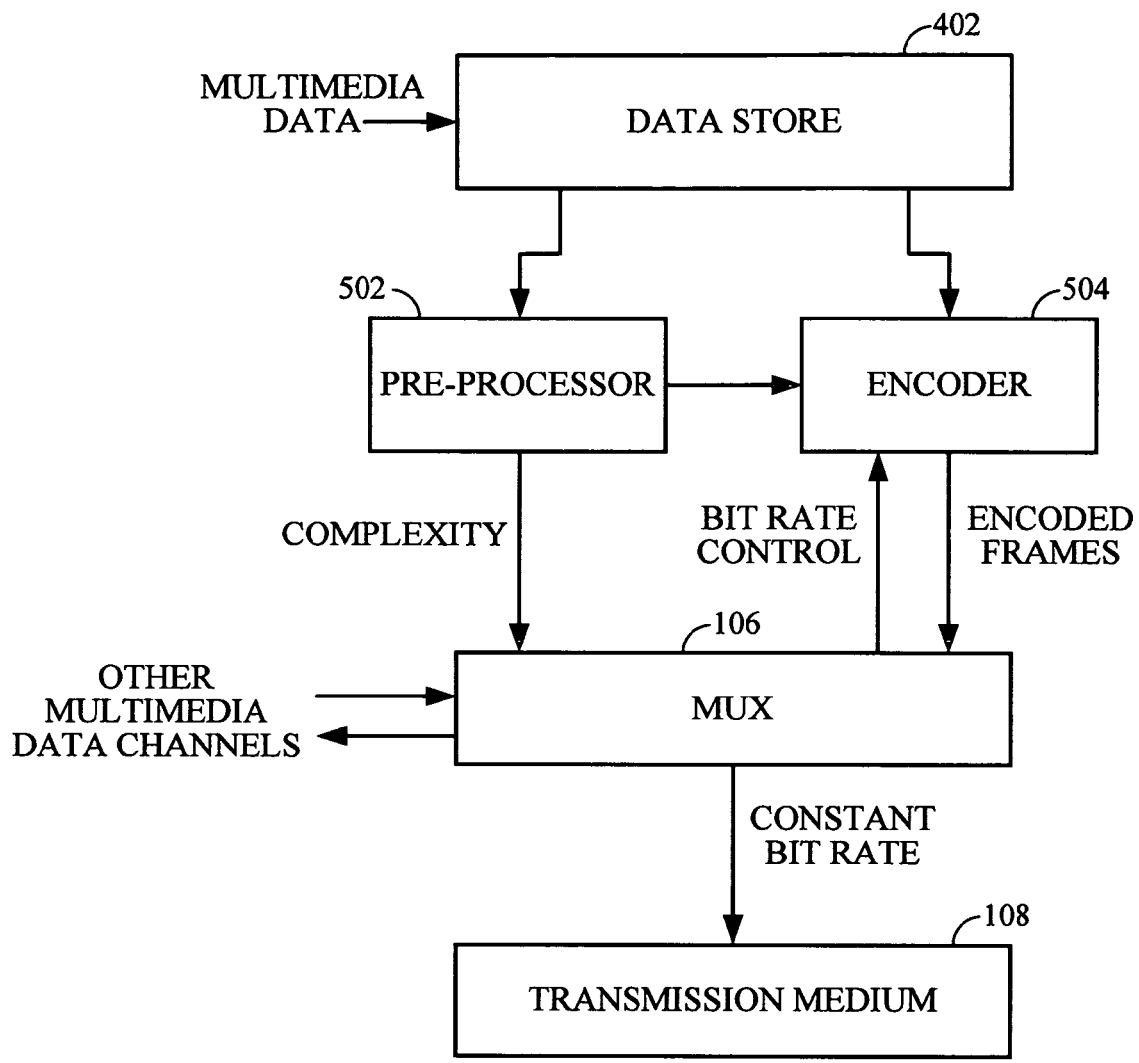
FIG. 5 is a system diagram illustrating an example of a single-pass, look ahead encoder that is interactive with a multiplexer.
Figure 6:
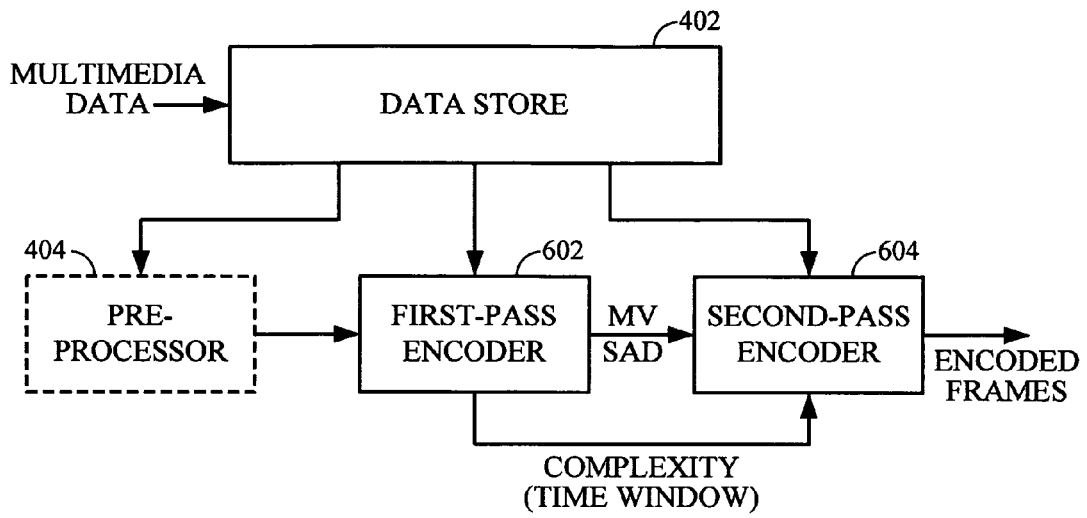
FIG. 6 is a system diagram illustrating an example of an independent multiple-pass, look ahead encoder.

FIGS. 5, 6, and 7 illustrate variations of systems similar to that shown in FIG. 4. Other variations will be readily determined by one of ordinary skill in the art. For example, one variant of the system illustrated in FIG. 4 is a system without the optional pre-processor 404. Removal of the pre-processor 404 eliminates a stage in the pipeline and the latency of the stage.

In the variation of FIG. 5, a pre-processor 502, which performs an analysis other than and less complicated than a first-pass encoding, provides a complexity metric. This can be useful in a system where, for example, processing power is limited. For example, a bandwidth ratio metric, which will be discussed later, can be used to determine the complexity.

The variation illustrated in FIG. 5 includes the data store 402, a pre-processor 502, an encoder 504, the multiplexer 106, and the transmission medium 108. The multiplexer 106 can allocate the bit rates for an encoder 504 depending on the complexity estimate from the pre-processor 502. The mapping between another metric, such as a bandwidth ratio from the pre-processor 502 and a bit rate control for the encoder 504 can be linear, non-linear, mapped via lookup tables within selected ranges, and the like.

The variation illustrated in FIG. 6 does not interact with a multiplexer. The variation of FIG. 6 includes the data store 402, the optional pre-processor 404, a first-pass encoder 602, and a second-pass encoder 604. It will be understood that the number of multiple-pass encoders can vary to other than two. Rather, the results of the first pass encoder are used by the second pass encoder without bit rate allocation dependent on complexity from other channels. This can be useful in systems where some variation in bit rate is tolerable due to a buffer, but near constant bit-rate encoding is desirable. In the illustrated system, the first-pass encoder 602 performs a first-pass encoding of the frames for a predetermined time, also known as super frame, and the complexity information is used to set the encoding of the second pass 604. One distinction between the variation of FIG. 6 and conventional dual-pass systems is that conventional dual-pass systems perform a pass of an entire media clip at a time, which is impractical for certain types of data, such as live data.

Figure 7A:
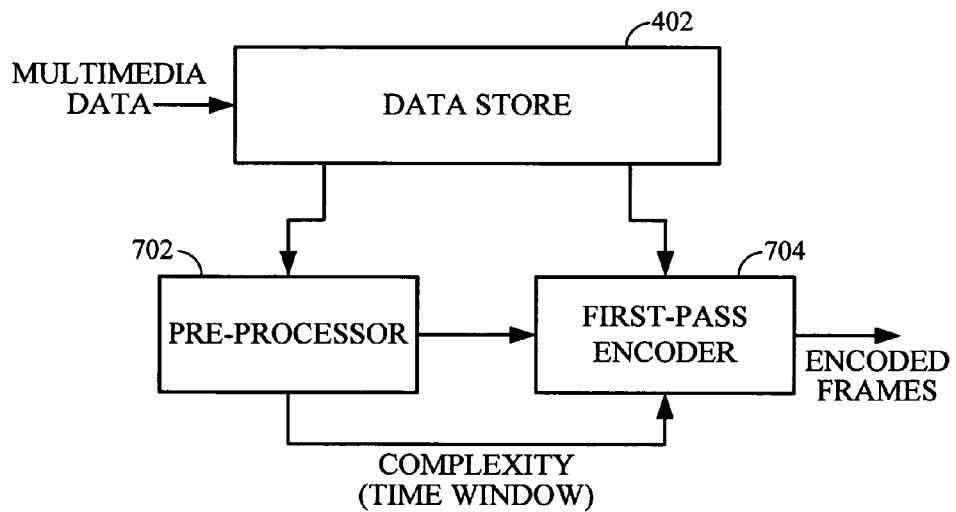
FIG. 7A is a system diagram illustrating an example of an independent single-pass, look ahead encoder.

The variation illustrated in FIG. 7A also does not interact with a multiplexer. The variation includes the data store 402, a pre-processor 702, and a first-pass encoder 704. The pre-processor 702 provides a time-windowed complexity metric to the first-pass encoder 704. The first-pass encoder 704 uses this information to select a bit rate to use for encoding of the corresponding multimedia data.

Figure 7B:
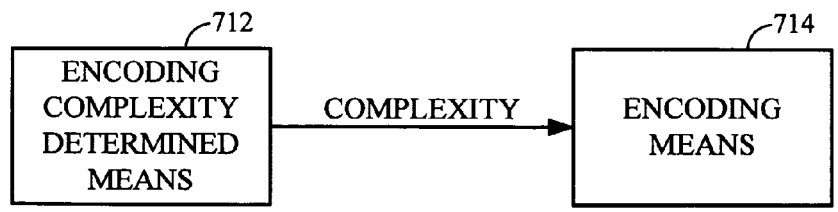
FIG. 7B is a system diagram illustrating an example of an encoding complexity determining means and an encoding means.

The variation illustrated in FIG. 7B can, but does not necessarily interact with a multiplexer. The variation includes an encoding complexity determining means 712, which provides a complexity indication to an encoding means 714. In one example, the encoding complexity determining means 712 can correspond to a pre-processor 502, and the encoding means 714 can correspond to the first-pass encoder 504. In another example, the encoding complexity determining means 712 can correspond to the first-pass encoder 602, and the encoding means 714 can correspond to second-pass encoder 604. In one aspect, the encoding complexity determining means 712 provides the complexity information for a time window of data, which the encoding means 714 subsequently encodes. In another aspect, the complexity information can be provided to a multiplexer or other module, which can then provide an adjusted bit rate to the encoding means 714.

Figure 8:
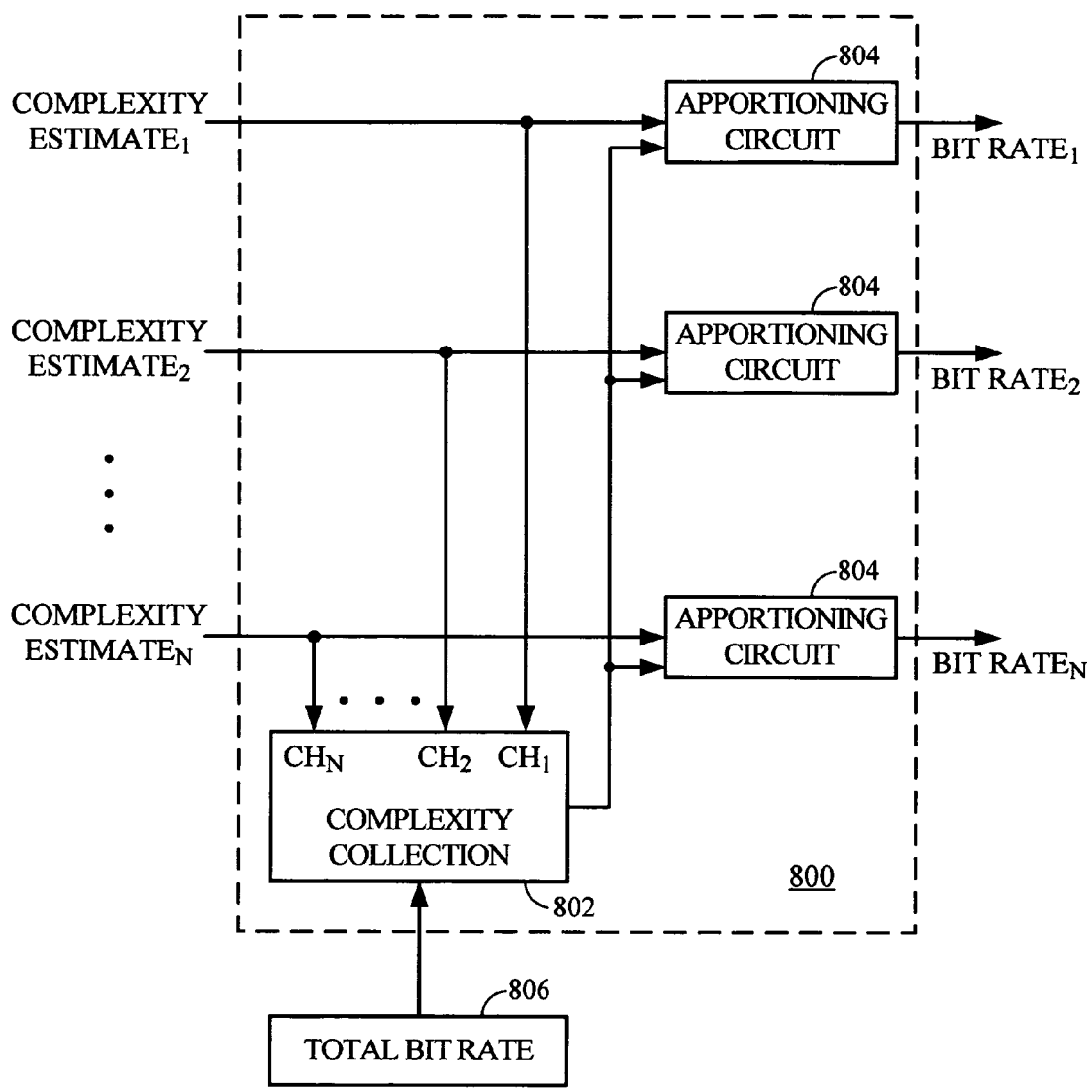
FIG. 8 is a system diagram illustrating an example of an apparatus for apportioning the available bandwidth of a multiplexed system based on the needs of the channels.

FIG. 8 is a system diagram illustrating an example of a processor 800 for apportioning the available bandwidth of a multiplexed system based on the needs or encoding complexity of the various sources of multimedia data. For example, such a processor can be incorporated into the multiplexer 106 or can be independent of the multiplexer 106.

The processor 800 illustrated in FIG. 8 includes a complexity collection circuit 802 and apportioning circuits 804. The complexity collection circuit 802 retrieves complexity estimates from, for example, multiple first-pass encoders. These complexity estimates are collected. The total bit rate 806, which can be a data value stored in a register, is allocated among the corresponding multimedia data. For example, there can be various bit rates set aside for high complexity, medium complexity, and low complexity, and these bit rates can then be selected based at least partially on the relative complexity estimates and provided to the apportioning circuits 804 accordingly. The apportioning circuits then communicate with, for example, second-pass encoders which use the apportioned bit rate for super frame level bit rate control.

Other aspects will now be described. Rate control can be performed at multiple levels. It should be noted that the rate control at the "super frame" level, that is, rate control for a fixed number of successive pictures or for a window of data, can be used in addition to rate control for groups of pictures (GOP), within a frame, and within a macroblock. For example, conventional techniques can be used for rate control within these other levels as well as techniques described herein. It should also be noted that depending on the content and size selected for a super frame, the size of a group of pictures can be larger than or smaller than size of a super frame.

Bandwidth Map Generation

Human visual quality V can be a function of both encoding complexity C and allocated bits B (also referred to as bandwidth).

Figure 9:
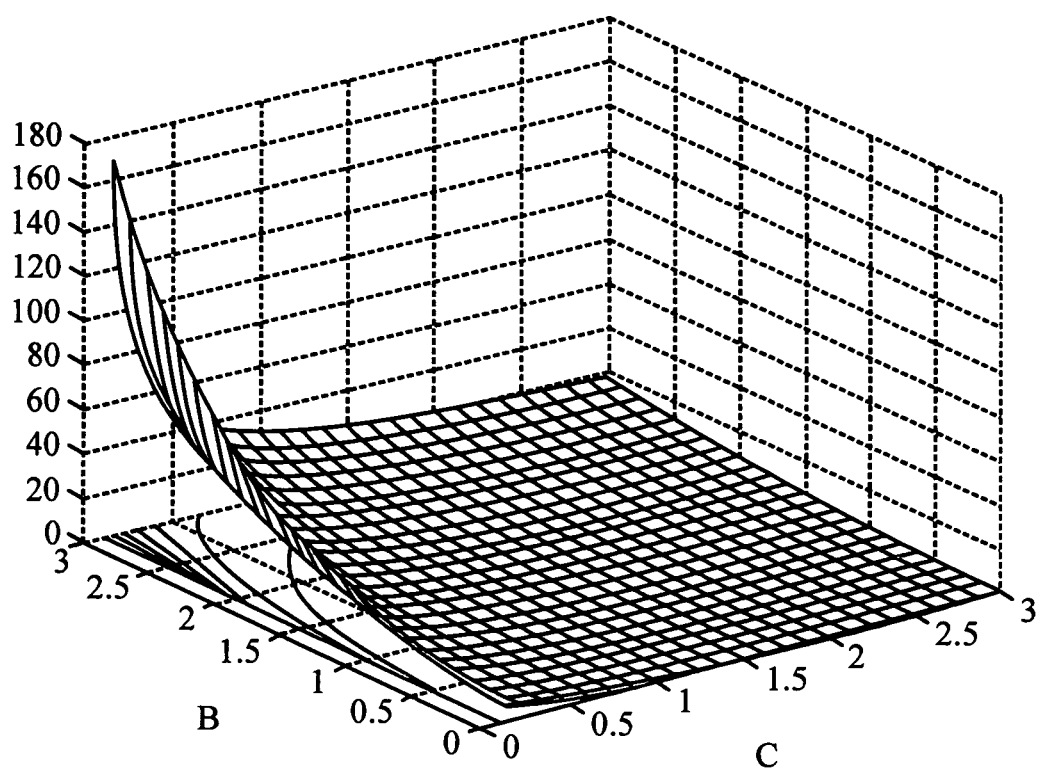
FIG. 9 is a 3-D map of an estimated visual quality function V versus encoding complexity C and allocated bits B.

It should be noted that the encoding complexity metric C considers spatial and temporal frequencies from the human vision point of view. For distortions more sensitive to human eyes, the complexity value is correspondingly higher. It can typically be assume that V is monotonically decreasing in C, and monotonically increasing in B. An example of this 3-D relationship is plotted in FIG. 9.

To achieve constant visual quality, a bandwidth ($B_i$) is assigned to the $i^{th}$ object (frame or MB) to be encoded that satisfies the criteria expressed in Equations 1 and 2.

$$B_i = B(C_i, V) \quad \text{(Eq. 1)}$$

$$B = \sum_i B_i \quad \text{(Eq. 2)}$$

In Equations 1 and/or 2, $C_i$ is the encoding complexity of the $i^{th}$ object, B is the total available bandwidth, and V is the achieved visual quality for an object. Human visual quality is difficult to formulate as an equation. Therefore, the above equation set is not precisely defined. However, if it is assumed that the 3-D model is continuous in all variables, bandwidth ratio ($B_i/B$) can be treated as unchanged within the neighborhood of a (C, P) pair. The bandwidth ratio $\beta_i$ is defined in Equation 3.

$$\beta_i = B_i/B \quad \text{(Eq. 3)}$$

The bit allocation problem can then be defined as expressed in Equation 4.

$$\beta_i = \beta(C_i) \quad \text{(Eq. 4)}$$
$$1 = \sum_i \beta_i, \text{ for } (C_i, V) \in \delta(C_0, V_0),$$

In the Equation 4 above, δ indicates the "neighborhood."

The encoding complexity is affected by human visual sensitivity, both spatial and temporal. Girod's human vision model is an example of a model that can be used to define the spatial complexity. This model considers the local spatial frequency and ambient lighting. The resulting metric is called $D_{csat}$. At a pre-processing point in the process, whether a picture is to be Intra-coded or Inter-coded is not known and bandwidth ratios for both are generated. For Intra-coded pictures, the bandwidth ratio is expressed in Equation 5.

$$\beta_{INTRA}\beta_{0INTRA} \log_{10}(1+\alpha_{INTRA}Y^2 D_{esat}) \quad \text{(Eq. 5)}$$

In the equation above, Y is the average luminance component of an MB, $\alpha_{INTRA}$ is a weighing factor for the luminance square and $D_{csat}$ term following it, $\beta_{0INTRA}$ is a normalization factor to guarantee $$1 = \sum_i \beta_i.$$

For example, a value for $\alpha_{INTRA}$=4 achieves good visual quality. The value of scaling factor $\beta_{0INTRA}$ is not important so long as bits are allocated according to the ratio between $\beta_{INTRA}$ of different video objects.

To understand this relationship, it should be noted that bandwidth is allocated logarithmically with encoding complexity. The luminance squared term reflects the fact that coefficients with larger magnitude use more bits to encode. To prevent the logarithm from getting negative values, unity is added to the term in the parenthesis. Logarithms with other bases can also be used.

Bit allocation for Inter-coded pictures needs to consider spatial as well as temporal complexity. This is expressed below in Equation 6.

$$\beta_{INTER}=\beta_{0INTER} \log_{10} (1+\alpha_{INTER} \cdot SSD \cdot D_{esat} \exp(-\gamma \|MV_P+MV_N\|^2)) \quad \text{(Eq. 6)}$$

In Equation 6, $MV_P$ and $MV_N$ are the forward and the backward motion vectors for the current MB. It can be noted that $Y^2$ in the INTRA formula is replaced by SSD, which stands for sum of squared difference.

To understand the role of $\|MV_P+MV_N\|^2$ in the Equation 6, note the next characteristics of human visual system: areas undergoing smooth, predictable motion (small $\|MV_P+MV_N\|^2$) attract attention and can be tracked by the eye and typically cannot tolerate any more distortion than stationary regions. However, areas undergoing fast or unpredictable motion (large $\|MV_P+MV_N\|^2$) cannot be tracked and can tolerate significant quantization. Experiments show that $\alpha_{INTER}$=1, γ=0.001 achieves good visual quality.

Frame type decision can be performed after $\beta_{INTRA}$ and $\beta_{INTER}$ are calculated for every frame. If $\beta_{INTER}/\alpha_{INTRA} \geq T$, or if scene change is detected, then a frame is encoded as an I-frame; otherwise it is encoded as a P-frame or a B-frame. The number of successive B-frames is content-adaptive.

GOP Level Rate Control (RC) and Frame Level RC

Different picture types have different encoding efficiency and different error robustness. An encoder and a decoder each maintain a buffer. The virtual buffer size determines how much burstiness can be tolerated. For example, if the virtual buffer size is set to the average size of eight seconds of multimedia data, then the rate control (RC) algorithm maintains the average bit rate over a time frame of eight seconds. Instantaneous bit rate can be much higher or lower than the average, but in any eight seconds of data, the average of the bit rate should stay in close proximity around the target bit rate.

The buffer fullness of the encoder buffer and that of the decoder buffer are dual of each other. An overflowing event of the decoder buffer corresponds to an underflowing event of the encoder buffer. An underflowing event of the decoder buffer corresponds to an overflowing event of the decoder buffer.

I-Frame QP Assignment

At the beginning of the bitstream, the Quantization Parameter (QP) is calculated for the first I-frame according to the average bit-per-pixel (bpp) value as illustrated in Equation 7.

$$QP_0 = 43 \times \exp\left(-1.15 \times bpp \times \sqrt{\frac{76800}{W \times H}}\right) + \Delta_{QP} \quad \text{(Eq. 7)}$$

This equation is taken from the Joint Video Team (JVT) specification. In the above equation, W and H are the width and the height of the picture respectively.

$$\Delta_{QP} = \frac{8 \times B(n_{i,0})}{T(n_{i,0})} - \min\left\{2, \frac{N_{gop}}{15}\right\},$$

and the parameters in this equation will be addressed shortly.

The encoder keeps track of the QP of the previously encoded P pictures. A smoothed P picture QP is obtained through the Equation 8.

$$QP'_I = (1-\alpha) \times QP'_I + \alpha \times QP_P \quad \text{(Eq. 8)}$$

In the equation above, $\alpha$ is an exponential weighting factor and $QP_P$ is the QP of the recently encoded P-frame.

The QP of the first I-frame in a GOP can be calculated using Equation 9.

$$QP_I = QP'_I + \Delta_{QP} \quad \text{(Eq. 9)}$$

P-Frame QP Assignment

The lower bound on frame size is initialized at the beginning of a group of pictures (GOP) as expressed in Equation 10.

$$L(n_{i,0}) = \frac{u(n_{i,0})}{F} - B(n_{i,0}) \quad \text{(Eq. 10)}$$

Equation 10 is taken from JVT, where $B(n_{i,0})$ is the buffer occupancy after coding the $(i-1)^{th}$ GOP and $B(n_{0,0})=0$, so that the buffer is initially empty, $u(n_{i,j})$ is the available channel bandwidth, and F is the predefined frame rate.

I-frames can take many bits to encode. The upper bound on frame size is initialized at the beginning of a group of pictures (GOP) as expressed in Equation 11.

$$U(n_{i,0}) = (b_1 - B(n_{i,0})) \times \overline{\omega} \quad \text{(Eq. 11)}$$

Equation 11 above is taken from JVT, where $b_1$ is a maximum number of bits spent on the initial I-frame. $\overline{\omega}$ is an overflow protection factor for a buffer.

After encoding every frame, the lower bound and the upper bound can be updated as expressed in Equations 12 and 13.

$$L(n_{i,j}) = L(n_{i,j-1}) + \frac{u(n_{i,j-1})}{F} - b(n_{i,j-1}) \quad \text{(Eq. 12)}$$

$$U(n_{i,j}) = U(n_{i,j-1}) + \left(\frac{u(n_{i,j-1})}{F} - b(n_{i,j-1})\right) \times \overline{\omega} \quad \text{(Eq. 13)}$$

Equations 12 and 13 are taken from JVT, where $b(n_{i,j})$ is the number of bits generated by the $j^{th}$ frame in the $i^{th}$ GOP.

The total bits for the remaining look-ahead can be calculated as expressed in Equation 14.

$$T(n_{i,j}) = \frac{u(n_{i,j})}{F} \times N_{RemainingLookAhead} - \frac{\beta_{RemainingLookAhead}}{\beta_{ProjectedBWSmoothingWin}} \times \beta(n_{i,j}) \quad \text{(Eq. 14)}$$

In Equation 14, $N_{RemainingLookAhead}$ is the number of remaining look-ahead frames, $\beta_{RemainingLookAhead}$ is the corresponding bandwidth metric of the remaining look-ahead frames, and $\beta_{ProjectedBWSmoothingWin}$ is the bandwidth metric of the projected bandwidth smoothing window. It can be seen that the task of emptying the buffer is distributed over the bandwidth smoothing window, whose size can be prescribed by a user. For example, to maintain an average bit rate of W for every eight seconds of video, the bandwidth smoothing window should be set to 8 times frame rate (frames per second).

The projected size of a P frame is expressed in Equation 15.

$$R(n_{i,j}) = T(n_{i,j}) \times \frac{\beta(n_{i,j})}{\sum_{k=j}^{N_{RemainingLookAhead}-1} \beta(n_{i,k})} \quad \text{(Eq. 15)}$$

In the above equation, $\beta(n_{i,j})$ is the bandwidth metric of the $j^{th}$ frame in the $i^{th}$ GOP, and it can be obtained through the bandwidth metric (B).

To prevent underflow and overflow of buffer occupancy, the clipping functions of Equations 16 and 17 are applied to $R(n_{i,j})$.

$$R(n_{i,j}) = \max\{L(n_{i,j}), f(n_{i,j})\} \quad \text{(Eq. 16)}$$

$$R(n_{i,j}) = \min\{U(n_{i,j}), f(n_{i,j})\} \quad \text{(Eq. 17)}$$

Equations 16 and 17 are taken from JVT. The quadratic modeling described in JVT can be applied to calculate Qstep and QP, where S is the SAD value obtained from motion estimation. The parameters in the quadratic model can be updated on a frame-by-frame basis using linear regression.

From the above discussion, it can be seen that the INTER frame RC is similar to the JVT recommendation, with the following improved characteristics; a large virtual buffer allows for sufficient bit rate variation and quasi-constant quality; frame size is allocated according to the frame complexity map; lookahead frames (super frames) are used to exploit anti-causal statistics.

B-Frame QP Assignment

This part can be identical to the JVT recommendation. If only one B-frame exists between a pair of I- or P-frames, Equation 18 can be used.

$$QP(n_{i,j}) = \begin{cases} \dfrac{QP_1 + QP_2 + 2}{2} & \text{if } QP_1 \neq QP_2 \\ QP_1 + 2 & \text{Otherwise} \end{cases} \quad \text{(Eq. 18)}$$

Equation 18 above is taken from JVT, where $QP_1$ and $QP_2$ are the quantization parameters for the I- or P-frame pair.

If the number of B-frames between a pair of I- or P-frames is L (L>1), Equation 19 can be used.

$$QP_i = QP_1 + \alpha + \\ \max\left\{\min\left\{\dfrac{(QP_2 - QP_1)}{L-1}(i-1), 2\times(i-1)\right\}, -2\times(i-1)\right\} \quad \text{(Eq. 19)}$$

The equation above is taken from JVT, where α is the difference between the quantization parameter of the first B frame and $QP_1$, and is given by Equation 20a.

$$\alpha = \min\{-3, \max\{2, 2\times L + QP_2 - QP_1\}\} \quad \text{(Eq. 20a)}$$

Super Frame Level Rate Control (RC)

Rate control at the super frame level is used so that the size of a super frame does not exceed the maximum prescribed value. In one aspect, if encoding is performed in multiple passes, the super frame level RC is not performed in the first pass.

After encoding a whole super frame, the encoder verifies that the size of the super frame is below the limit. If not, the bandwidth map of the frames in the current super frame can be scaled down as described in Equation 20b. In equation 20b, P is a protection factor between 0 and 1.

$$B(i,j)^* = \dfrac{\text{maximum super frame size}}{1st - \text{pass super frame size}} * P \quad \text{(Eq. 20b)}$$

Basic Unit Level Rate Control (RC)

A basic unit can be either one or multiple macroblocks.

INTRA Basic Unit QP Adjustment

The relationship expressed in Equation 21 can be used for Intra basic unit QP adjustment.

$$\dfrac{\Delta Q}{Q} = -A\dfrac{\beta - \bar{\beta}}{\bar{\beta}} \quad \text{(Eq. 21)}$$

In Equation 21, A is a non-negative parameter determined by experiment, and $\bar{\beta}$ is the average bandwidth ratio of a video object neighborhood. A value for A=0.08 yields good visual quality. The change in QP is further subject to a prescribed limit to prevent abrupt changes.

INTER Basic Unit QP Adjustment

The INTER basic unit QP is assigned according to the quadratic model, which is taken from JVT as expressed in Equation 22.

$$R = S\left(\dfrac{X_1}{Q} + \dfrac{X_2}{Q^2}\right) \quad \text{(Eq. 22)}$$

Adaptive Basic Unit Size

The size of the basic unit determines how frequently QP can be adjusted. However, too much QP adjustment increases overhead. The adaptive basic unit sizing groups macroblocks (MBs) of similar QPs together and assign a single QP to them.

Figure 10:
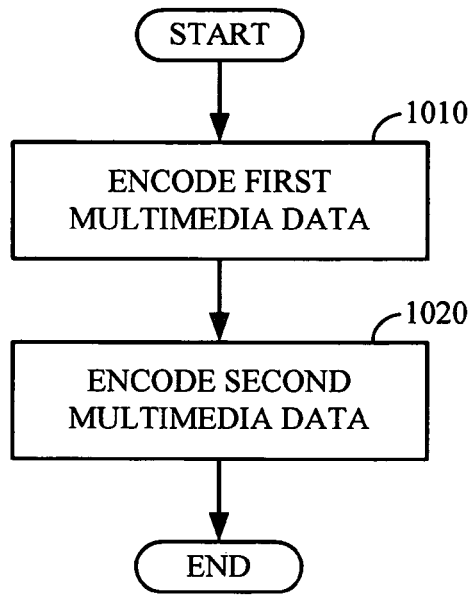
FIG. 10 illustrates an example of a method for encoding multimedia data.

FIG. 10 illustrates an example a method for encoding multimedia data. The illustrated method includes encoding 1010 a first multimedia data corresponding to a selected window of data; and encoding 1020 a second multimedia data different than the first multimedia data, the second multimedia data corresponding to the selected window of data while re-encoding the first multimedia data.

Figure 11:
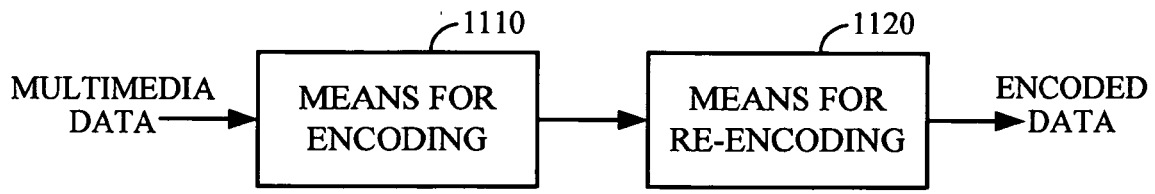
FIG. 11 illustrates an example of an apparatus for encoding multimedia data.

FIG. 11 illustrates an example of an apparatus for encoding multimedia data. The illustrated apparatus includes a means for encoding 1110 a first multimedia data corresponding to a selected window of data and a second multimedia data different than the first multimedia data, the second multimedia data corresponding to the selected window of data; and a means for re-encoding 1120 the first multimedia data while the encoding means 1110 encodes the second multimedia data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Some or all of the system can be performed in a processor not shown. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other examples and additional elements may be added. Thus, the present invention is not intended to be limited to the embodiments shown herein but is to be accorded the widest scope consistent with the principles and novel features disclosed herein.

What is claimed is:

1. A method of encoding received video data, the method comprising:
    determining a first encoding complexity based on a first portion of received video data to be encoded, wherein the first encoding complexity is at least partially based on a logarithm of a metric for an object of the first portion and a luminance of the first portion, wherein the metric is based on a combination of local spatial frequency and ambient light; and
    encoding the first portion of the received video data at least partially based on the first encoding complexity.

2. The method of claim 1, further comprising:
    receiving a target bit rate, said target bit rate being determined at least partially based on the first encoding complexity, wherein encoding further comprises encoding the first portion so that the encoded first portion can be transmitted at a bit rate that approximates the target bit rate.

3. The method of claim 1, further comprising:
    wherein the first encoding complexity is based on an encoding of the first portion;
    receiving a target bit rate, said target bit rate being determined at least partially based on the first encoding complexity, wherein encoding further comprises re-encoding the first portion so that the re-encoded first portion can be transmitted at a bit rate that approximates the target bit rate.

4. The method of claim 1, further comprising:
    wherein the first encoding complexity is not based on an encoding process;
    retrieving a second encoding complexity for the first portion of the video data, wherein a target bit rate is at least partially determined based on the first encoding complexity and the second encoding complexity.

5. The method of claim 1, wherein the first portion corresponds to video data of a predetermined time period that is less than a duration of a video clip.

6. The method of claim 5, wherein the predetermined time period is about one second.

7. The method of claim 1, wherein the first portion corresponds to video data of a predetermined number of frames.

8. The method of claim 1, wherein the object is a macroblock or a frame.

9. An apparatus for encoding received video data, the apparatus comprising:
    means for determining a first encoding complexity based on a first portion of received video data to be encoded, wherein the first encoding complexity is at least partially based on a logarithm of a metric for an object of the first portion and a luminance of the first portion, wherein the metric is based on a combination of local spatial frequency and ambient light; and
    means for encoding the first portion of the received video data at least partially based on the first encoding complexity.

10. The apparatus of claim 9, further comprising means for receiving a target bit rate, said target bit rate being determined at least partially based on the first encoding complexity, wherein encoding further comprises encoding the first portion so that the encoded first portion can be transmitted at a bit rate that approximates the target bit rate.

11. The apparatus of claim 9, wherein the first encoding complexity is based on an encoding of the first portion, further comprising means for receiving a target bit rate, said target bit rate being determined at least partially based on the first encoding complexity, wherein the encoding means further comprises means for re-encoding the first portion so that the re-encoded first portion can be transmitted at a bit rate that approximates the target bit rate.

12. The apparatus of claim 9, further comprising:
    wherein the first encoding complexity is not based on an encoding process;
    means for retrieving a second encoding complexity for the first portion of the video data, wherein a target bit rate is at least partially determined based on the first encoding complexity and the second encoding complexity.

13. The apparatus of claim 9, wherein the first portion corresponds to video data of a predetermined time period that is less than a duration of a video clip.

14. The apparatus of claim 13, wherein the predetermined time period is about one second.

15. The apparatus of claim 9, wherein the first portion corresponds to video data of a predetermined number of frames.

16. The apparatus of claim 9, wherein the object is a macroblock or a frame.

17. An apparatus of encoding received video data, the apparatus comprising:
    a processor configured to determine a first encoding complexity based on a first portion of received video data to be encoded, wherein the first encoding complexity is at least partially based on a logarithm of a metric for an object of the first portion and a luminance of the first portion, wherein the metric is based on a combination of local spatial frequency and ambient light; and
    an encoder configured to encode the first portion of the received video data at least partially based on the first encoding complexity.

18. The apparatus of claim 17, wherein the encoder is further configured to receive a target bit rate, said target bit rate being determined at least partially based on the first encoding complexity, wherein the encoder is further configured to encode the first portion so that the encoded first portion can be transmitted at a bit rate that approximates the target bit rate.

19. The apparatus of claim 17, wherein the first encoding complexity is based on an encoding of the first portion, wherein the encoder is configured to receive a target bit rate, said target bit rate being determined at least partially based on the first encoding complexity, wherein the encoder is further configured to re-encode the first portion so that the re-encoded first portion can be transmitted at a bit rate that approximates the target bit rate.

20. The apparatus of claim 17, wherein the first encoding complexity is not based on an encoding process, wherein the encoder is further configured to retrieve a second encoding complexity for the first portion of the video data, wherein a target bit rate is at least partially determined based on the first encoding complexity and the second encoding complexity.

21. The apparatus of claim 17, wherein the first portion corresponds to video data of a predetermined time period that is less than a duration of a video clip.

22. The apparatus of claim 21, wherein the predetermined time period is about one second.

23. The apparatus of claim 17, wherein the first portion corresponds to video data of a predetermined number of frames.

24. The apparatus of claim 17, wherein the object is a macroblock or a frame.

25. The apparatus of claim 17, further comprising a multiplexer, where the multiplexer is configured to provide the encoder with a target bit rate based at least in part on an encoding complexity.

26. A computer program product embodied in a non-transitory medium with instructions for encoding received video data, the computer program product comprising:
   a module with instructions for determining a first encoding complexity based on a first portion of received video data to be encoded, wherein the first encoding complexity is at least partially based on a logarithm of a metric for an object of the first portion and a luminance of the first portion, wherein the metric is based on a combination of local spatial frequency and ambient light; and
   a module with instructions for encoding the first portion of the received video data at least partially based on the first encoding complexity.

27. The computer program product of claim 26, further comprising:
   a module with instructions for receiving a target bit rate, said target bit rate being determined at least partially based on the first encoding complexity, wherein the module with instructions for encoding further comprises instructions for encoding the first portion so that the encoded first portion can be transmitted at a bit rate that approximates the target bit rate.

28. The computer program product of claim 26, further comprising:
   wherein the first encoding complexity is based on an encoding of the first portion;
   a module with instructions for receiving a target bit rate, said target bit rate being determined at least partially based on the first encoding complexity, wherein the module with instructions for encoding further comprises instructions for re-encoding the first portion so that the re-encoded first portion can be transmitted at a bit rate that approximates the target bit rate.

29. The computer program product of claim 26, further comprising:
   wherein the first encoding complexity is not based on an encoding process;
   a module with instructions for retrieving a second encoding complexity for the first portion of the video data, wherein a target bit rate is at least partially determined based on the first encoding complexity and the second encoding complexity.

30. The computer program product of claim 26, wherein the first portion corresponds to video data of a predetermined time period that is less than a duration of a video clip.

31. The computer program product of claim 30, wherein the predetermined time period is about one second.

32. The computer program product of claim 26, wherein the first portion corresponds to video data of a predetermined number of frames.

33. The computer program product of claim 26, wherein the object is a macroblock or a frame.

34. A method for encoding received multimedia data comprising:
   encoding a first multimedia data corresponding to a selected window of data based on an encoding complexity of video data to be encoded that is at least partially based on a logarithm of a metric for an object of the first video portion and a luminance of the first portion, wherein the metric is based on a combination of local spatial frequency and ambient light; and
   encoding a second multimedia data different than the first multimedia data, the second multimedia data corresponding to the selected window of data while re-encoding the first multimedia data.

35. The method of claim 34, wherein the selected window of data corresponds to approximately 1 second of data.

36. The method of claim 34, wherein the first multimedia data comprises video data and encoding of the first multimedia data comprises:
   determining an encoding complexity for the video data; and encoding the video data.

37. The method of claim 34, wherein re-encoding the first multimedia data uses encoding statistics from encoding the first multimedia data.

38. An apparatus for encoding multimedia data comprising:
   means for encoding a first multimedia data corresponding to a selected window of data and a second multimedia data different than the first multimedia data, the second multimedia data corresponding to the selected window of data, wherein encoding the first multimedia data comprises encoding the data based on a logarithm of a complexity metric of video data to be encoded for an object of the first multimedia data and a luminance of the video data to be encoded for the object of the first multimedia data, wherein the metric is based on a combination of local spatial frequency and ambient light; and
   means for re-encoding the first multimedia data while the encoding means encodes the second multimedia data.

39. The method of claim 38, wherein the selected window of data corresponds to approximately 1 second of data.

40. The method of claim 38, wherein the first multimedia data comprises video data and the encoding means comprises:
   means for determining an encoding complexity for the video data; and means for encoding the video data.

41. The method of claim 38, wherein there-encoding means uses encoding statistics from the encoding means to re-encode the first multimedia data.

42. An apparatus for encoding multimedia data comprising:
   a first encoder configured to encode a first multimedia data corresponding to a selected window of data and to encode a second multimedia data different than the first multimedia data, the second multimedia data corresponding to the selected window of data, wherein encoding the first multimedia data comprises encoding the data based on a logarithm of a complexity metric of video data to be encoded for an object of the first multimedia data and a luminance of the video data to be encoded for the object of the first multimedia data, wherein the metric is based on a combination of local spatial frequency and ambient light; and
   a second encoder configured to re-encode the first multimedia data while the first encoder is encoding the second multimedia data.

43. The apparatus of claim 42, wherein the selected window of data corresponds to approximately 1 second of data.

44. The apparatus of claim 42, wherein the first multimedia data comprises video data and the first encoder comprises:
- a processor configured to determine an encoding complexity for the video data; and
- an encoder configured to encode the video data.

45. The apparatus of claim 42, wherein the second encoder is configured to receive encoding statistics from the first encoder to re-encode the first multimedia data.

46. A computer program product embodied in a non-transitory medium with instructions for encoding multimedia data comprising:
- a module with instructions for encoding a first multimedia data corresponding to a selected window of data based on an encoding complexity of video data to be encoded and for encoding a second multimedia data different than the first multimedia data, the second multimedia data corresponding to the selected window of data, wherein the encoding complexity is at least partially based on a logarithm of a metric for an object of the first video portion and a luminance of the object of the first video portion, wherein the metric is based on a combination of local spatial frequency and ambient light;
- a module with instructions for re-encoding the first multimedia data while the module with instructions for encoding is encoding the second multimedia data.

47. The computer program product of claim 46, wherein the selected window of data corresponds to approximately 1 second of data.

48. The computer program product of claim 46, wherein the first multimedia data comprises video data and the module with instructions for encoding of the first multimedia data comprises:
- a module with instructions for determining an encoding complexity for the video data; and
- a module with instructions for encoding the video data.

49. The computer program product of claim 46, wherein the module with instructions for re-encoding the first multimedia data comprises instructions for using encoding statistics received from the module with instructions for encoding of the first multimedia data.

\* \* \* \* \*